US012367557B2

(12) United States Patent
Lecoq et al.

(10) Patent No.: US 12,367,557 B2
(45) Date of Patent: Jul. 22, 2025

(54) REMOVING INDEPENDENT NOISE USING DEEPINTERPOLATION

(71) Applicant: ALLEN INSTITUTE, Seattle, WA (US)

(72) Inventors: Jerome Anthony-Jean Lecoq, Seattle, WA (US); Michael David Oliver, Seattle, WA (US); Joshua Handman Siegle, Seattle, WA (US); Christof Koch, Seattle, WA (US)

(73) Assignee: Allen Institute, Seattle, WA (US)

( * ) Notice: Subject to any disclaimer, the term of this patent is extended or adjusted under 35 U.S.C. 154(b) by 27 days.

(21) Appl. No.: 17/772,971

(22) PCT Filed: Oct. 7, 2020

(86) PCT No.: PCT/US2020/054605
§ 371 (c)(1),
(2) Date: Apr. 28, 2022

(87) PCT Pub. No.: WO2021/086562
PCT Pub. Date: May 6, 2021

(65) Prior Publication Data
US 2024/0161247 A1   May 16, 2024

Related U.S. Application Data

(60) Provisional application No. 62/928,934, filed on Oct. 31, 2019.

(51) Int. Cl.
*G06T 5/70* (2024.01)
*G06T 5/50* (2006.01)

(52) U.S. Cl.
CPC .................. *G06T 5/70* (2024.01); *G06T 5/50* (2013.01); *G06T 2200/04* (2013.01);
(Continued)

(58) Field of Classification Search
CPC ......... G06T 5/70; G06T 5/50; G06T 2200/04; G06T 2207/10016; G06T 2207/10088;
(Continued)

(56) References Cited

U.S. PATENT DOCUMENTS 11,900,566 B1 *  2/2024  Ferr?s .................. G06T 5/70
2016/0358314 A1 * 12/2016  Ji ........................ H04N 19/36
(Continued)

FOREIGN PATENT DOCUMENTS

| WO | WO 2019030410 A1 | 2/2019 |
| WO | WO 2019102476 A2 | 5/2019 |
| WO | WO 2019147767 A1 | 8/2019 |

OTHER PUBLICATIONS

International Search Report and Written Opinion, dated Jan. 26, 2021, for International Patent Application No. PCT/US2020/054605. (11 pages).

*Primary Examiner* — Iriana Cruz
(74) *Attorney, Agent, or Firm* — Seed Intellectual Property Law Group LLP

(57) ABSTRACT

A facility for transforming a subject data item sequence is described. The facility accesses a trained relationship model. For each of a plurality of subject items of the subject data item sequence, the facility: selects a first contiguous series of items of the subject data item sequence immediately before the subject data item; selects a second contiguous series of items of the subject data item sequence immediately after the subject data item; and applies the trained relationship model to the selected first and second contiguous series of data items to obtain a denoised version of the subject data item. The facility then assembles the obtained denoised subject data items into a denoised data item sequence.

18 Claims, 19 Drawing Sheets

(52) U.S. Cl.
CPC ............... *G06T 2207/10016* (2013.01); *G06T 2207/10088* (2013.01); *G06T 2207/20081* (2013.01); *G06T 2207/20084* (2013.01)

(58) Field of Classification Search
CPC . G06T 2207/20081; G06T 2207/20084; G06T 5/60; G06N 3/045; G06N 3/08; H04N 5/21
See application file for complete search history.

(56) References Cited

U.S. PATENT DOCUMENTS

| | | | |
|---|---|---|---|
| 2019/0304067 A1* | 10/2019 | Vogels | ...................... G06T 5/50 |
| 2020/0389672 A1* | 12/2020 | Kennett | ................. H04N 19/59 |
| 2021/0274224 A1* | 9/2021 | Kennett | ................ G06T 3/4053 |

* cited by examiner

REMOVING INDEPENDENT NOISE USING DEEPINTERPOLATION

CROSS-REFERENCE TO RELATED APPLICATIONS

This application claims the benefit of provisional U.S. Application No. 62/928,934 filed Oct. 31, 2019 and entitled "REMOVING UNCORRELATED NOISE USING DEEP INTERPOLATION" which is hereby incorporated by reference in its entirety.

STATEMENT OF GOVERNMENT INTEREST

This invention was made with government support under NS107610 awarded by the National Institutes of Health. The government has certain rights in the invention.

BACKGROUND

Noisy data is a major impediment to any scientific effort. Noise can be broadly categorized into Signal-dependent and Signal-independent noise. When dealing with independent noise, noise at two different points in time cannot be predicted from one another. Signal-dependent noise differs as it can be at least partially predicted between samples: it is non-independent.

The traditional approach to remove independent noise is to design filters in the temporal, frequency, or spatial domain. For instance, band-pass frequency filters are built to amplify certain frequencies and dampen others. These filters are chosen based on analyzing the underlying signal and potential sources of noise.

DETAILED DESCRIPTION

Introduction

The inventors have recognized that conventional approaches of designing filters to remove independent noise have significant disadvantages. A first is that this requires a skilled artisan to analyze the relationship between the noise and signal, who are rare and expensive. Further, it in many cases proves impossible to remove meaningful levels of noise without disrupting the signal.

In response, the inventors have conceived and reduced to practice a software and/or hardware facility for removing independent noise from a time series or other series of data samples or data items—such as a sequence of video frames—to interpolate a frame near the center of a contiguous series of frames ("the facility"). Because the signal of interest generally exhibits correlation between successive samples, the facility learns the underlying relationships between samples however complex they may be, provided there is enough data. In this framework, one does not design filters to remove noise, but instead uses the learned statistical relationships between samples to reconstruct the signal at each sample of the series. The facility does this by looping through the samples of the sequence and, in each iteration of the loop, applying to the samples before and after the current sample a machine learning model trained to predict ("interpolate") the current sample. Because independent noise cannot be predicted from one sample to another, it is removed in the reconstructed signal.

Figure 1:
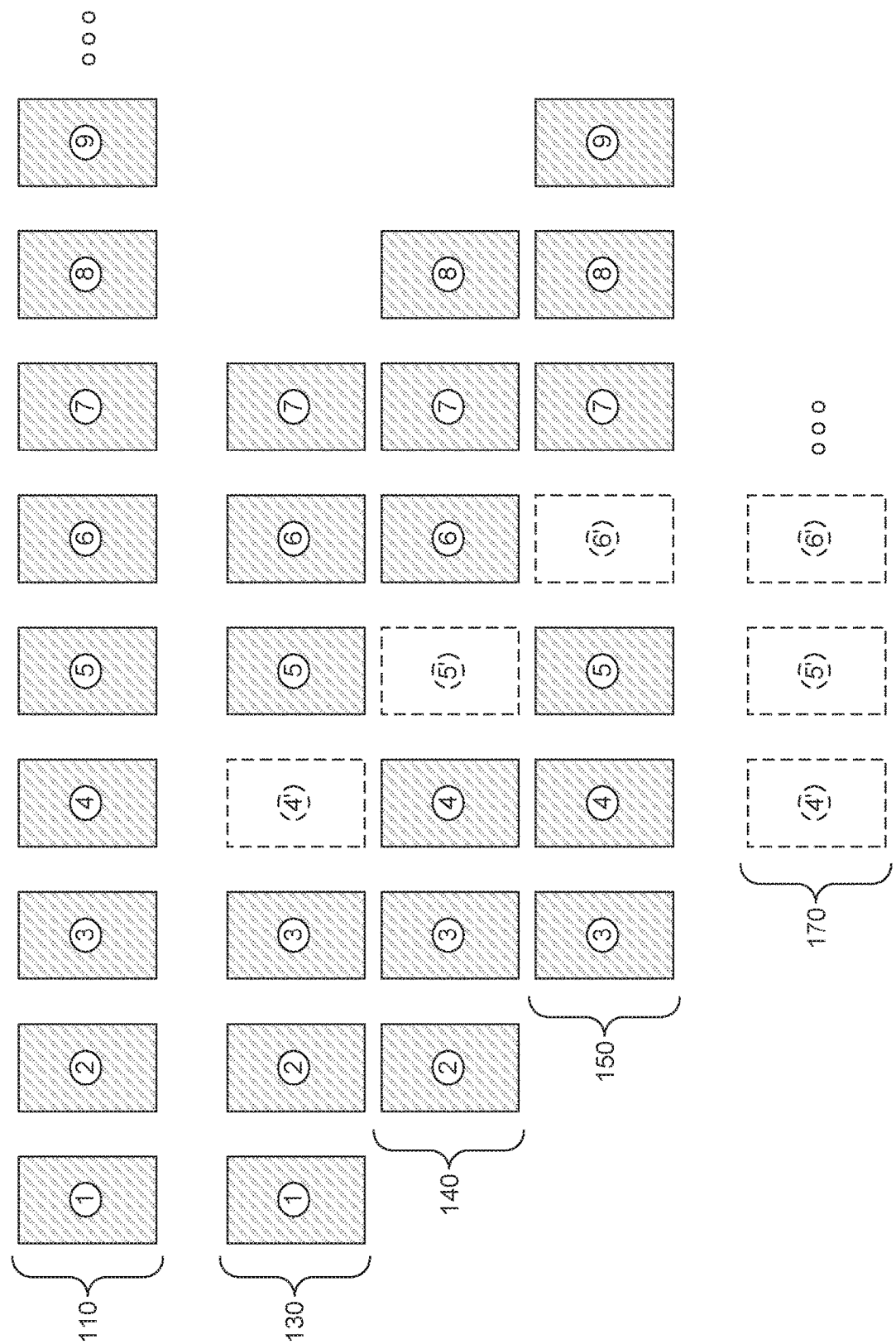
FIG. 1 is a time series diagram showing how deep learning interpolation (or "DeepInterpolation") is used to denoise the signal in a time series.

FIG. 1 is a time series diagram showing how deep learning interpolation (or "DeepInterpolation") is used to denoise the signal in a time series. Row 110 shows the raw frames 1-9 of the time series, which include independent noise. Each of rows 130, 140, and 150 show the application of the time series model to a different gapped subsequence of raw frames to predict a denoised frame in the center of the sequence. For example, row 130 shows the facility applying the model to raw frames 1-3 and 5-7 in order to predict denoised frame 4' in the center of this subsequence. While denoised frame 4' corresponds to the position of raw frame 4 in the subsequence, in some embodiments, the contents of raw frame 4 are disregarded in the application of the model represented by row 130. In each of rows 140 and 150, the facility predicts the contents of a different denoised frame, such that it accumulates a result comprised mainly or exclusively of frames denoised in this manner, shown in row 170. This process is sometimes described in terms of a "frame window": a fixed number of frames that traverses the time series, from a first position in the time series where it contains the first frame of the time series and frames that immediately follow the first frame, through a last position in the time series where it contains the last frame of the time series and frames that immediately precede the last frame. In the example shown in FIG. 1, the frame window has a size of 7 frames, and rows 130, 140, and 150 correspond to its first three positions in the time series.

In various embodiments, the facility is applied to denoise data in a variety of domains. In some embodiments, the facility is applied across a dimension other than time, such as a spatial dimension. As one example, in some embodiments, the facility is applied to denoise a three-dimensional image, such as a three-dimensional image produced by electron microscopy, or computer tomography of biological tissue, or temperature and atmospheric pressure in a 3-D atmospheric weather map. In some embodiments, the facility divides the three-dimensional image into a series of two-dimensional images as a sequence of values in one of the three dimensions. The facility then performs interpolation to denoise most or all of the two-dimensional images, which it then reassembles into a denoised version of the three-dimensional image. In some embodiments, the facility then repeats this process in one or both of the remaining dimensions to remove additional noise.

In another approach to denoising a three-dimensional image, in some embodiments the facility loops through substantially all of the pixels in the three-dimensional image. For each, the facility selects a three-dimensional region within the three-dimensional image that surrounds but does not include the pixel, and applies the interpolation model to this region order to produce a denoised version of the pixel. It assembles these denoised pixels into a denoised version of the three-dimensional image.

While the facility's application to neuronal recordings and other particular data domains are discussed specifically herein, in various embodiments the facility is adapted to sequences of any type of data of any dimension that contains independent noise.

By performing in some or all of the ways described above, the facility more effectively removes independent noise from sequenced data than existing approaches, without requiring a clean, ground-truth dataset for training, nor domain knowledge for designing a custom filter.

Also, the facility improves the functioning of computer or other hardware, such as by reducing the dynamic display area, processing, storage, and/or data transmission resources needed to perform a certain task, thereby enabling the task to be performed by less capable, capacious, and/or expensive hardware devices, and/or be performed with less latency, and/or preserving more of the conserved resources for use in performing other tasks. For example, by removing more noise from a data sequence, the facility makes it more compressible, causing it to consume a smaller volume of storage space, permitting more compressed data sequences to be stored on a device of a given size, or a smaller, less expensive storage device to be used to store the same number of compressed data sequences.

Computing Hardware

Figure 2:
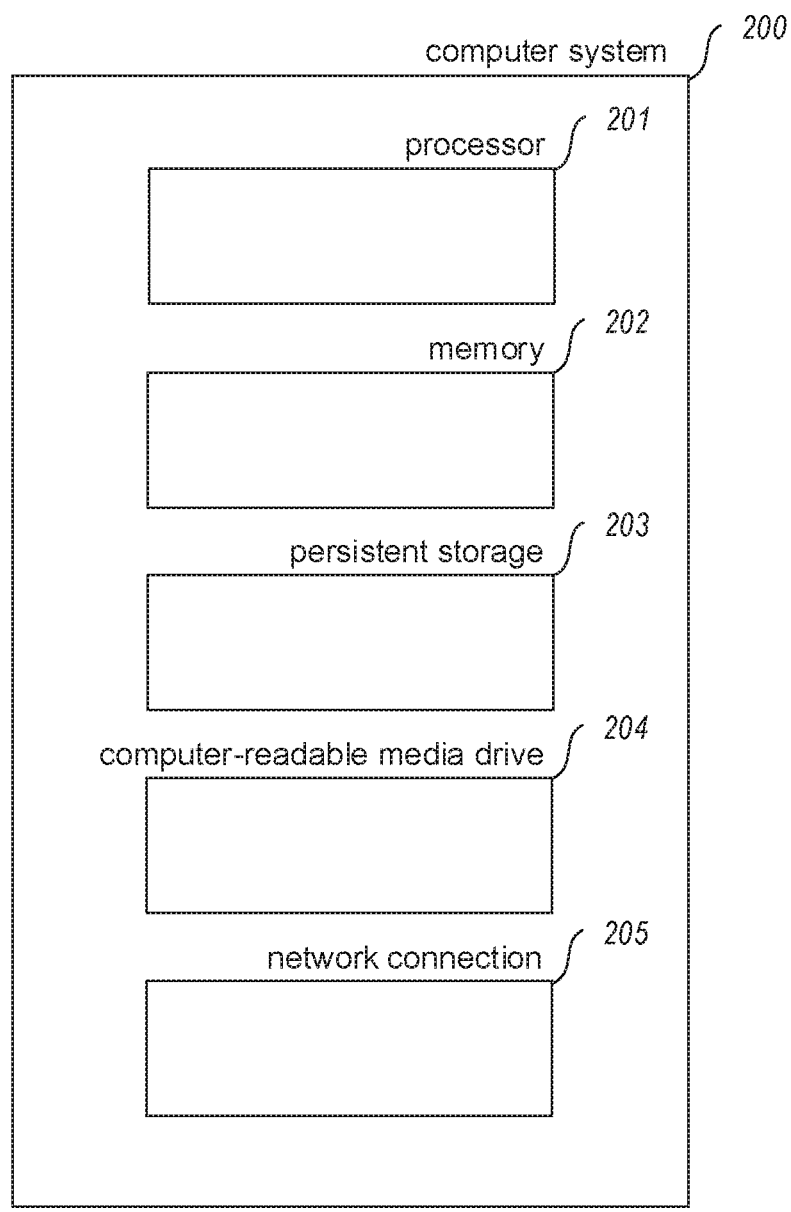
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, physiological sensing devices, and/or their associated display devices, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

General Approach

The facility applies a general purpose denoising approach sometimes referred to herein as DeepInterpolation as follows:

1. Construct a deep convolutional neuronal network (or other function approximator appropriate for the problem at hand) that can learn highly non-linear and sophisticated interpolating functions between data points.

2. Choose input data from data blocks that have potential relationships with the data point to predict such as adjacent data points. In some embodiments, the facility provides only data points for which the underlying noise is independent with the data to be predicted. This eliminates the risk of overfitting the noise.

3. Train the network on the entire set of data available. Because noise is independent of signal, the network will only learn to predict the underlying signal, not the noise.

Figure 3:
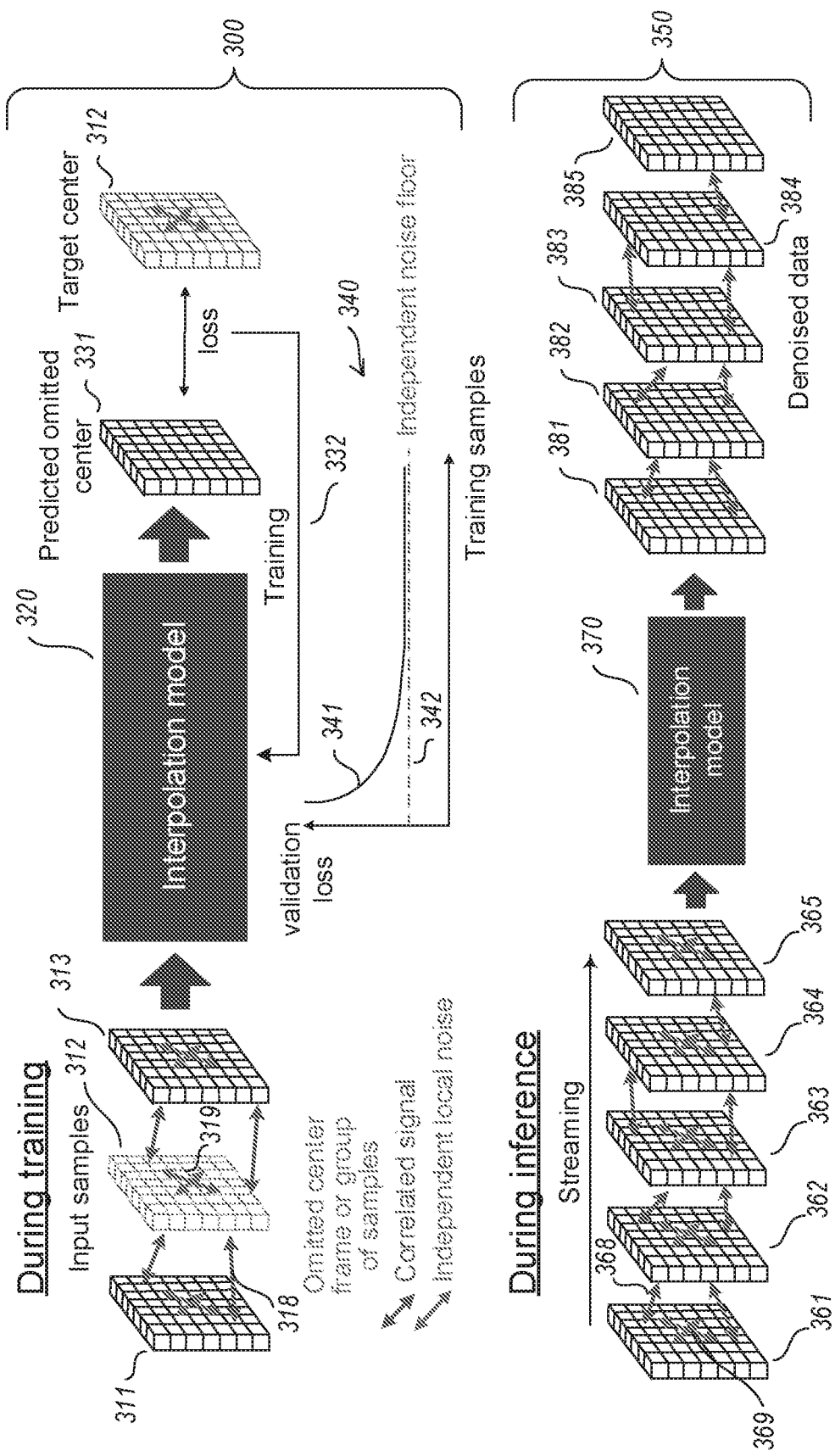
FIG. 3 is a data flow diagram showing the DeepInterpolation process performed by the facility in some embodiments.

FIG. 3 is a data flow diagram showing the DeepInterpolation process performed by the facility in some embodiments. The diagram shows a training phase 300 in which the facility trains its interpolation model 320 using one sequence of frames or other samples 311-313 at a time. Importantly, the facility omits one or more frames or other samples 312 at or near the center of the sequence from those used in the training iteration. The sequence of input samples is used to train the interpolation model to predict the center frame omitted from the input samples (frame 331 as predicted). The facility calculates a loss by comparing the predicted omitted center sample to the actual center sample of the training sequence. This loss is used as a basis to adjust the trained state 332 of the model. Overall, this process is shown in graph 340, which illustrates the reduction of validation loss 341 toward an uncorrelated noise floor 342 as training progresses.

Figure 4:
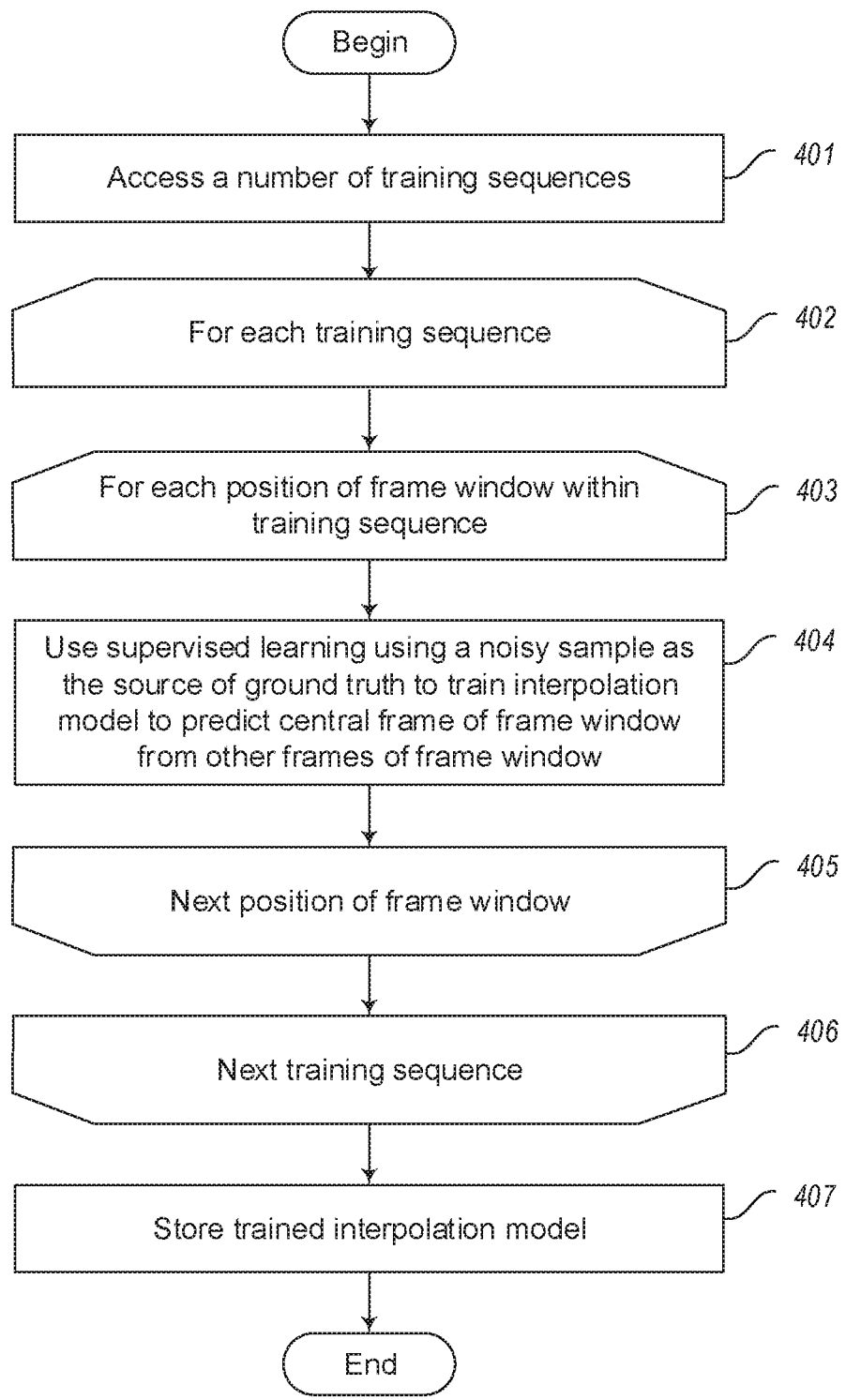
FIG. 4 is a flow diagram showing a process performed by the facility in some embodiments to train the interpolation model.

FIG. 4 is a flow diagram showing a process performed by the facility in some embodiments to train the interpolation model. In act 401, the facility accesses a number of training sequences. In acts 402-406, the facility loops through each training sequence accessed in act 401. In acts 403-405, the facility loops through each position of a frame window within a training sequence. The frame window is a contiguous sequence of frames in the training sequence of a particular size, such as 60 frames. In the loop that is the subject of acts 403-405, the facility progresses from a position of the frame window that contains the first frame of the training sequence through a position of the frame window that contains the last frame of the training sequence. In act 404, the facility uses supervised learning using a noisy sample as the source of ground truth to train its interpolation model to predict the central frame of the frame window in its present position from other frames of the frame window. In some embodiments, this central frame is exactly in the center of the frame window. In some embodiments, the central frame is offset from the center of the frame window, such that it is closer to either the beginning of the frame window or the end of the frame window. In act 405, if one or more additional positions of the frame window remain to be processed, then the facility continues in act 403 to process the next position of the frame window, else the facility continues in act 406. In act 406, if one or more additional training sequences remain to be processed, then the facility continues in act 402 to process the next training sequence, else the facility continues in act 407. In act 407, the facility stores the ending state of the trained interpolation model. After act 407, this process concludes.

Those skilled in the art will appreciate that the acts shown in FIG. 4 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Returning to FIG. 3, the data flow diagram shows a denoising phase 350 in which the facility uses its trained interpolation model to predict most of the frames of a subject sequence. The data flow shows an original sequence of frames 361-365 making up the subject sequence. It can be seen that there is a correlated signal 368 that is present across subsequences of two or more contiguous frames, as well as independent local noise 369 that does not span consecutive frames. The facility applies the trained interpolation model 370 within frame windows traversing the subject sequence, for each different position of the frame window predicting a denoised version of a central frame or other sample within the frame window, thus producing denoised data including, for example, frames 381-385. It can be seen that the denoised data continues to contain the correlated signal from the original subject sequence, but less or none the independent local noise.

Figure 5:
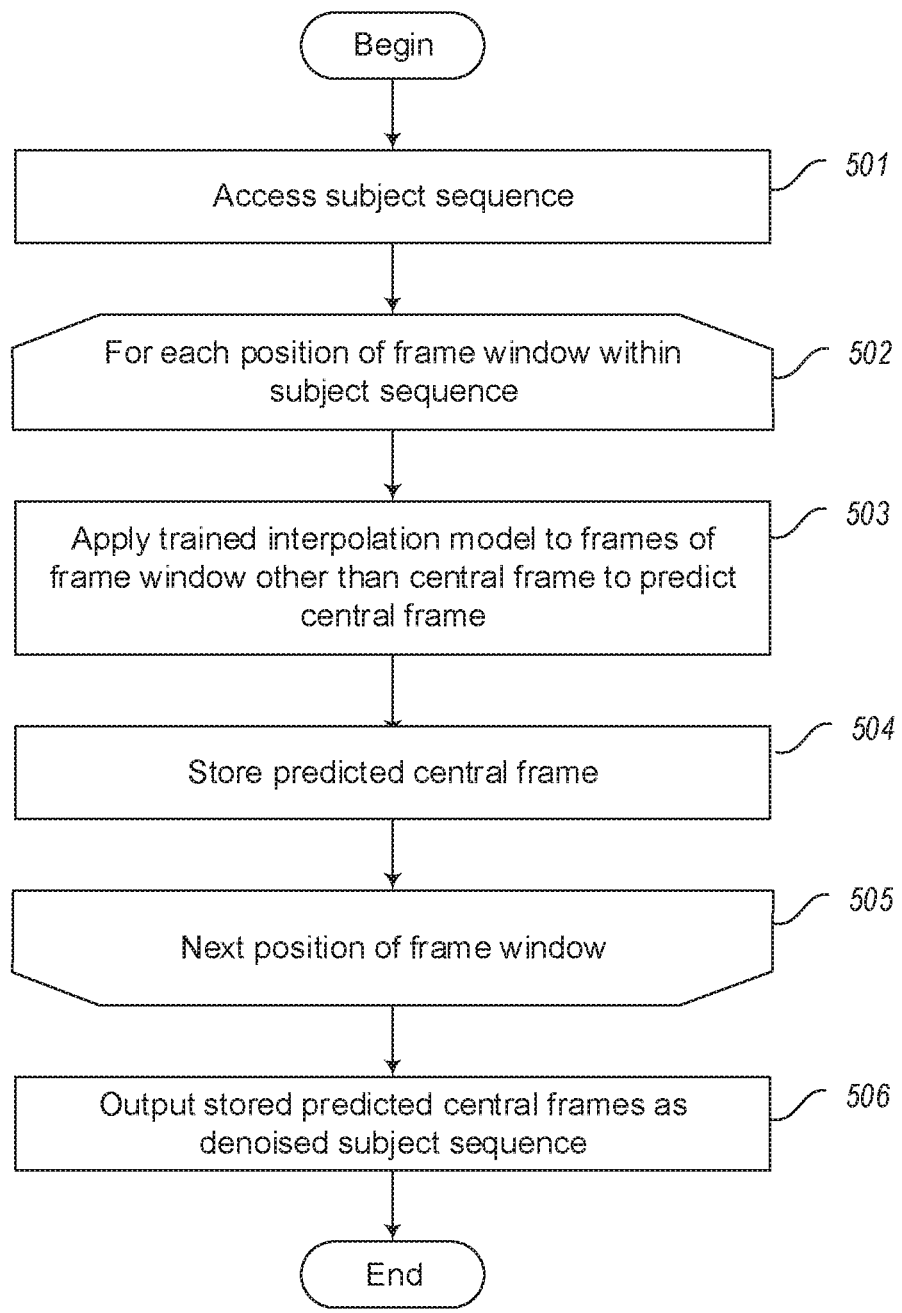
FIG. 5 is a flow diagram showing a process performed by the facility in some embodiments in order to denoise a subject sequence.

FIG. 5 is a flow diagram showing a process performed by the facility in some embodiments in order to denoise a subject sequence. In act 501, the facility accesses the subject sequence. In acts 502-505, the facility loops through each position of a frame window within the subject sequence. In act 503, the facility applies the trained interpolation model to the frames of the frame window in its present position other than the central frame in the frame window in order to predict the central frame in the frame window. In act 504, the facility stores the central frame predicted in act 503. In act 505, if one or more additional positions of the frame window remain to be processed, then the facility continues in act 502 to process the next position of the frame window, else the facility continues in act 506. In act 506, the facility outputs the predicted central frames stored in act 504 as the denoised subject sequence. In various embodiments, the outputting of act 506 comprises storing this denoised subject sequence, playing or otherwise presenting the denoised subject sequence; subjecting the denoise subject sequence to machine vision analysis; etc. After act 506, this process concludes.

Denoising In Vivo Two Photon Calcium Imaging

Two photon calcium imaging is used to monitor the activity of neuronal cells in vivo. It is a technique widely used in neuroscience as it provides unique access to neuronal activity in the brain of behaving animals. It relies on a pulsed laser source that scans neuronal tissue labelled with fluorescent reporters of intracellular calcium levels.

A major limitation of calcium imaging is the intrinsic presence of Poisson noise. As few fluorescent photons are detected per pixel, the inherent statistics of rare events cause large fluctuations in the recorded fluorescence signal. The data collected in a calcium imaging experiment thus typically appears as an extremely noisy movie where the underlying structure is only barely visible within each frame. This limits the Signal to Noise Ratio of these recordings (SNR) and greatly impairs any ability to detect the activity of individual neurons.

For typical analyses of in vivo imaging experiments, Poisson noise is averaged out using a region of interest (ROI) paired with temporal binning. This approach, however, limits the available temporal and spatial resolution. And even after such post-processing steps, Poisson noise is still present and greatly limits the ability to distinguish individual calcium events.

To improve upon this approach, the facility leverages the inherent structure of the data both in space and time. Recently, deep learning has been shown to be a powerful method for learning statistical dependencies within data. In particular, the UNET architecture (a deep, fully convolutional autoencoder with skip connections) has proven to be a powerful tool for mapping between structurally related images, such as biomedical images and labeled segmentations of the images. However, in the case of calcium imaging, it is not simple matter to learn a mapping from a noisy recorded image to a clean version, as no clean data without Poisson noise is readily available to train models on.

A recent approach called Noise2Noise, however, has demonstrated that deep neuronal networks can be trained to perform image restoration without access to any clean data, with performance comparable or exceeding training using cleaned data. They demonstrated that this was possible in cases where the additive noise has zero mean, as is the case in two photon calcium imaging. However, unlike the data used in this paper, pairs of images with identical structure but different noise are unavailable to the inventors.

Figure 6:
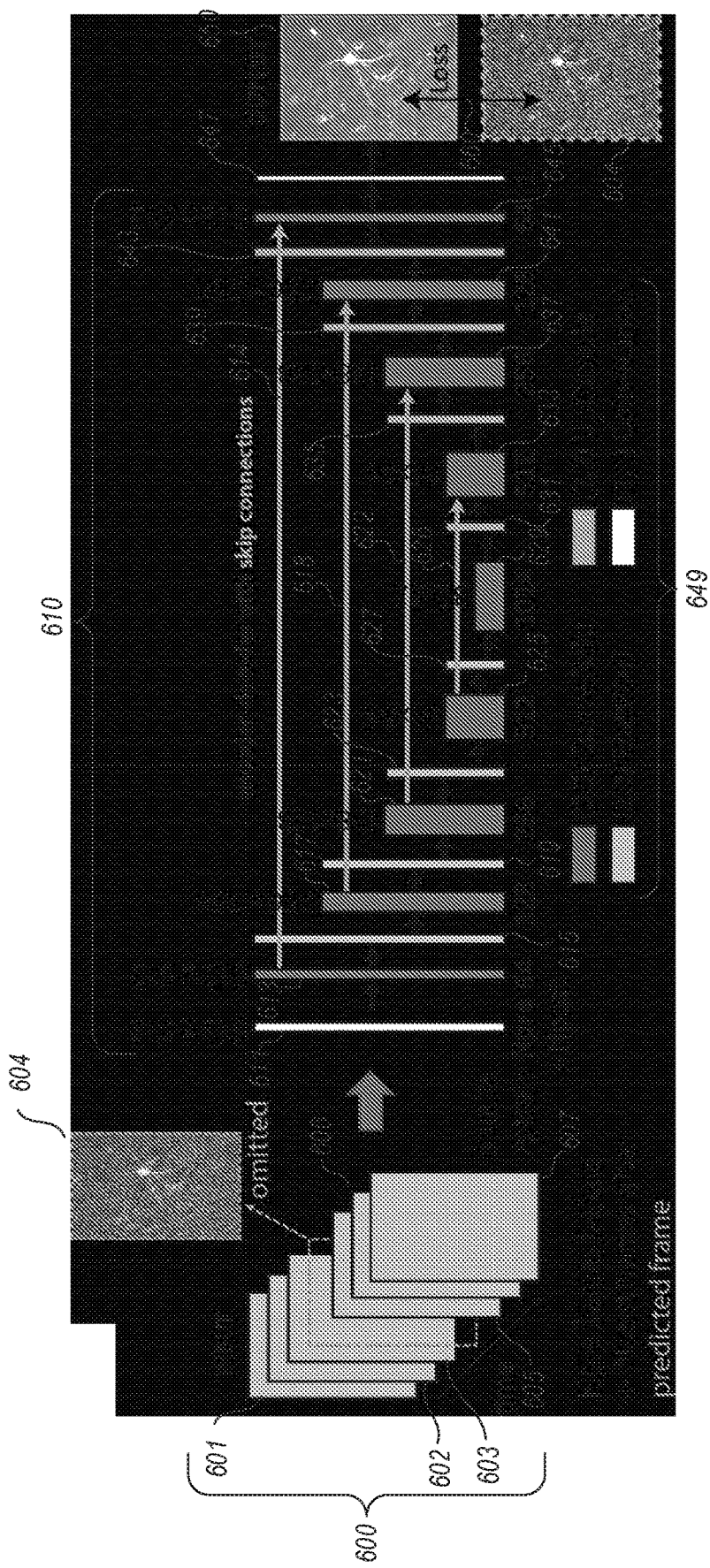
FIG. 6 is a data flow diagram showing a sample architecture used by the facility in some embodiments to denoise two photon calcium video data.

To apply DeepInterpolation to denoise in vivo two photon calcium imaging data, the inventors constructed an augmented UNET architecture designed to learn an interpolation function rather than a 1-to-1 mapping. FIG. 6 is a data flow diagram showing a sample architecture used by the facility in some embodiments to denoise two photon calcium video data, such as in vivo or in vitro two photon calcium video data. The diagram shows input 600 to the network 610 that is made up of a series of frames 601-607 from a calcium imaging experiment, Npre consecutive frames before and Npost consecutive frames after a single frame 604 of the movie; that single frame is the target for the network. In some embodiments, Npre and Npost were both set to 30 frames.

The inventors chose these intervals based on knowledge of the signal correlation. The rises and decays of calcium spikes are typically contained within 1 second. Therefore, at any particular frame to be predicted, the recorded fluorescence of a cell can be influenced by its value 1 second before (30 frames at 30 Hz sampling rate). Likewise, the following 30 frames also carry information about the frame to be predicted given the slow decay of calcium transients. This frame window configuration is discussed further below in connection with FIG. 7.

The network is tasked with predicting the missing frame 604 in the middle of those 60 frames 601-607 of the frame window. The facility defines the loss 660 of the training as the mean absolute difference between a Z-score version of the predicted frame 650 and the actual frame 604. Because Poisson noise is independent, the network cannot predict the noise. To decrease its loss, the network's only option is to predict the expected fluorescence of each pixel given the spatio-temporal information from previous and successive frames.

A key 649 shows the type and parameters for each of the layers making up the network, layers 611, 613, 615, 617, 619, 621, 623, 625, 627, 629, 631, 633, 635, 637, 639, 641, 643, 645, 647. Additionally, the network includes skip connections: skip connection 614 between layer 613 and layer 645; skip connection 618 between layer 617 and layer 641; skip connection 622 between layer 621 and layer 637; and skip connection 626 between layer 625 and layer 633.

The inventors trained this network on 450,000 samples randomly taken from the Allen Institute two-photon database.

Figure 7:
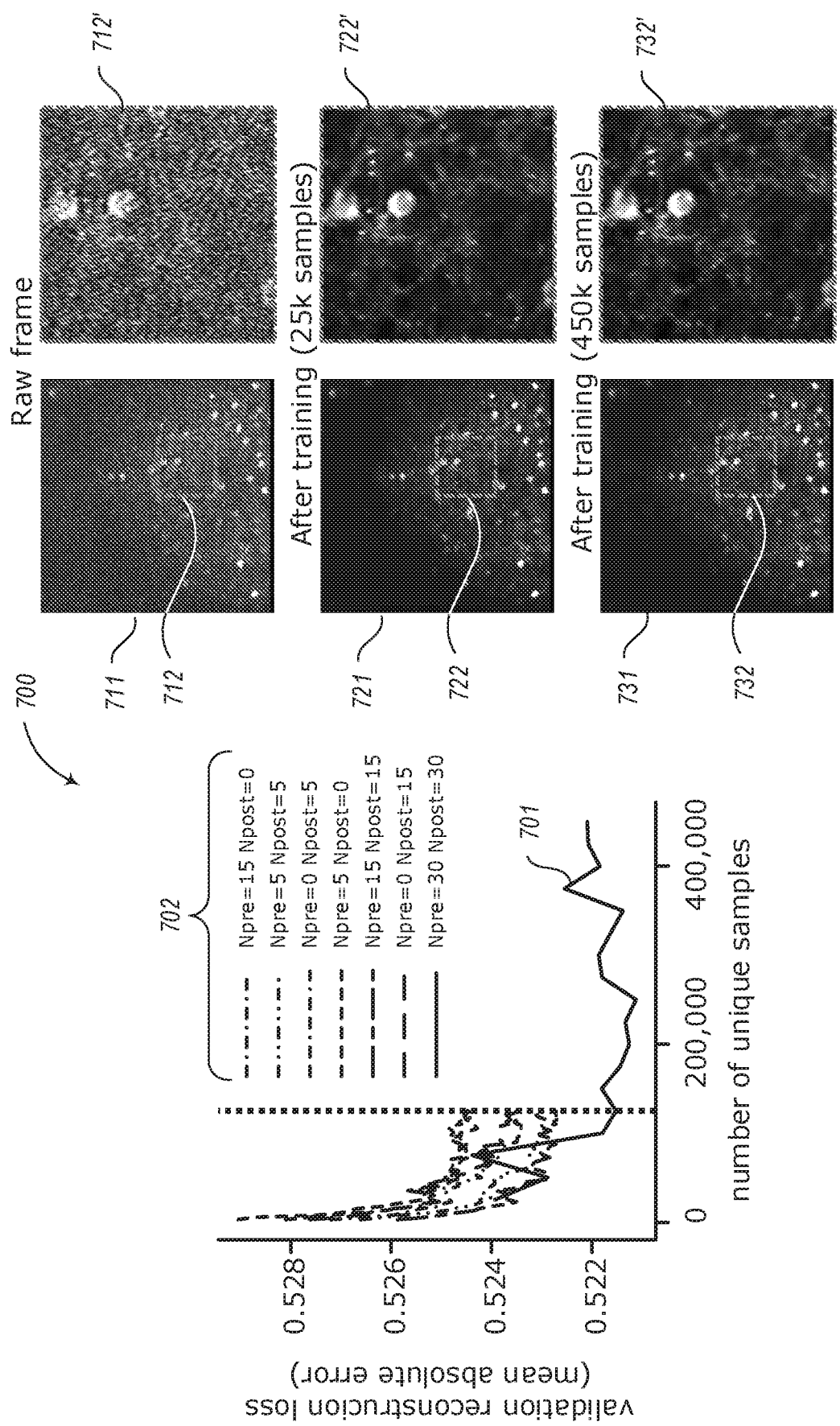
FIG. 7 is a graph and image diagram showing results of the inventors' experiment.

FIG. 7 is a graph and image diagram showing results of the inventors' experiment. Graph 700 shows the validation reconstruction loss for seven different frame window configurations tested by the inventors in the experiment, identified in key 702. The graph shows the mean absolute error of Z-score frames determined for each of the tested frame window configurations through 140,000 unique samples of model training. After that point, the experiment continued with only the most effective frame window configuration, consecutive frames before and 30 consecutive frames after the predicted frame. The mean absolute error 701 for this frame window configuration is shown through more than 400,000 unique samples of training. A set of images in the diagram show the results of denoising a sample frame of a subject sequence as training of the model processed in the experiment. In particular, image 711 shows the original sample frame which contains subregion 712. Subregion 712 of original frame 711 is shown at increased magnification as image 712'. Image 721 shows a denoised version of original frame 711 produced by the facility using the interpolation model after it had been trained with 25,000 samples. Subregion 722 of this first denoised version of the frame is similarly shown at greater magnification as image 722'. By comparing image 722' to image 712', a viewer can appreciate a significantly lower amount of noise in image 722'. Image 731 is a denoised version of frame 711 produced using the interpolation model after it has been trained with 450,000 samples. It contains subregion 732, shown at greater magnification as image 732'. By comparing image 732' to images 722' and 712', it can be seen that image 732' contains even less noise. Further, image 732' has superior contrast to images 722' and 712', making the smallest neuronal compartments more clearly visible in image 732'.

Figure 8:
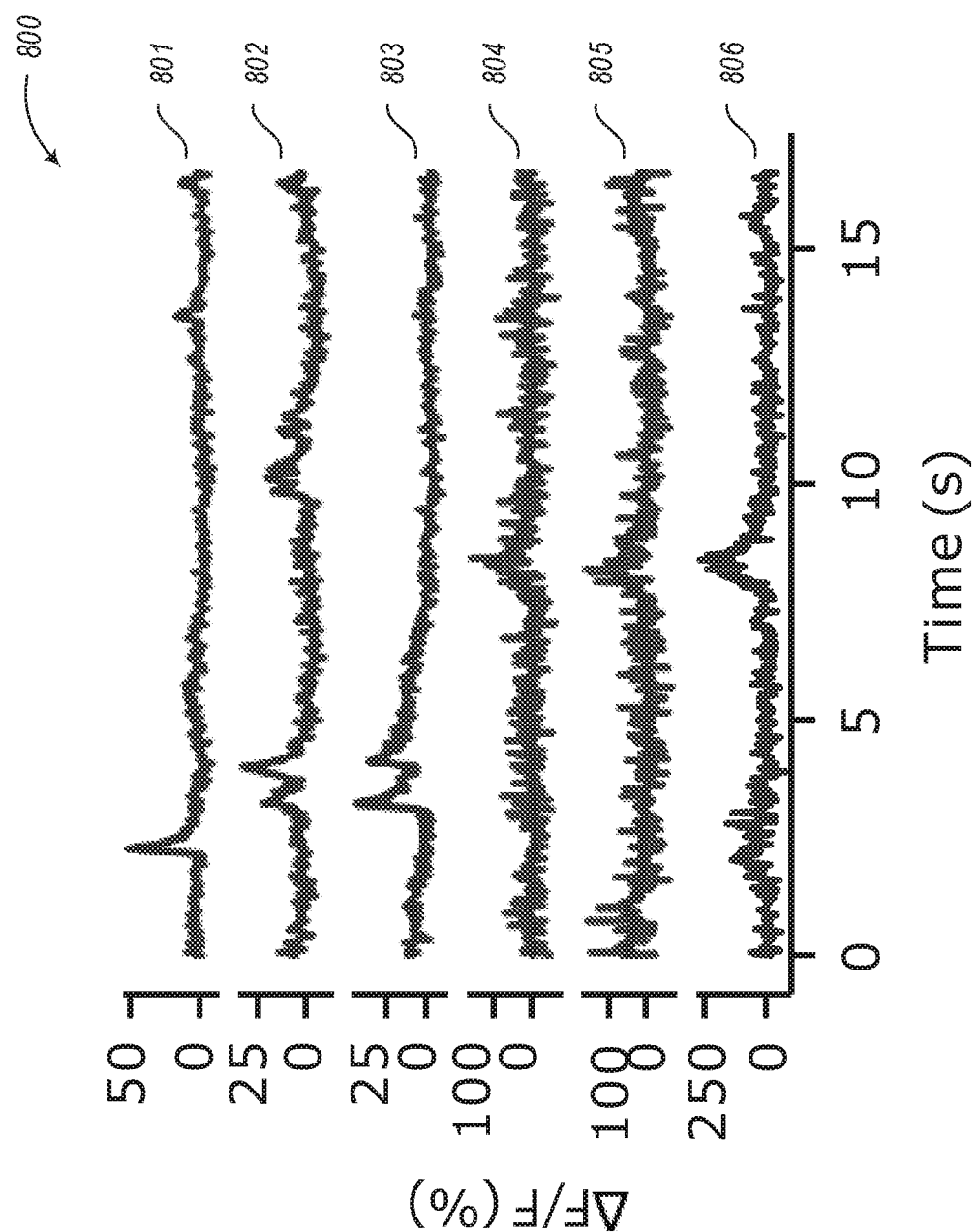
FIG. 8 is a graph diagram showing denoising results produced over time by the facility for in vivo two photon calcium imaging.

FIG. 8 is a graph diagram showing denoising results produced over time by the facility for in vivo two photon calcium imaging. In particular, the graph 800 contains three example traces 801-803 extracted from a semantic ROI, and three traces 804-806 extracted from a single pixel. In the case of each trace, the smoother red denoised curve is superimposed over the less smooth black original curve.

Figure 9:
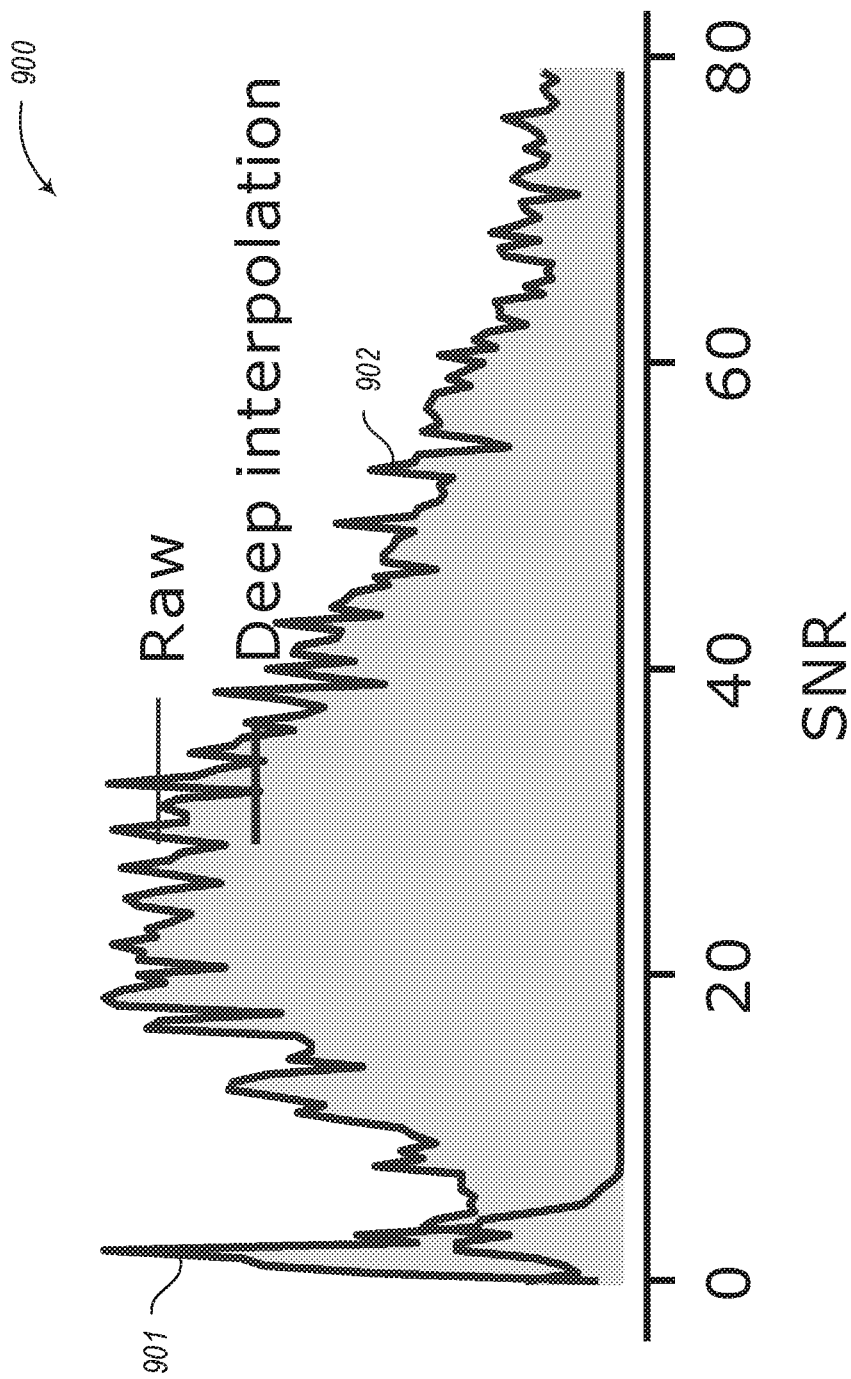
FIG. 9 is a graph diagram comparing the signal-to-noise ratio of individual pixels of in vivo two photon calcium imaging before and after denoising by the facility.

FIG. 9 is a graph diagram comparing the signal-to-noise ratio (SNR) of individual pixels of in vivo two photon calcium imaging before and after denoising by the facility. SNR is here defined as the ratio of mean pixel values over their standard deviation across time. In particular, the graph 900 is a histogram that shows that the denoised pixels 902 have a much higher signal-to-noise ratio than the original pixels 901. Note that the graph shows results for 10,000 pixels, normalized to maximum density and randomly selected within the experiment.

Denoising In Vivo Electrophysiological Recordings

To demonstrate the generalizability of the facility, the inventors also applied it to in vivo electrophysiological recordings. Silicon probes are one of the most common methods for recording individual action potentials coming from neuronal cells. In this case, the signal coming from each spike is distributed both in time and across multiple recording sites present on the probe shank. Noise in this recording modality comes from a few very different sources: electrical noise (thermal noise, flicker noise, and shot noise), as well as various artifacts caused by the biological tissue. Interestingly, many of these sources of noise are also independent and therefore the same approach used for two-photon imaging is able to yield large gains in SNR and the number of detected neurons.

Figure 10:
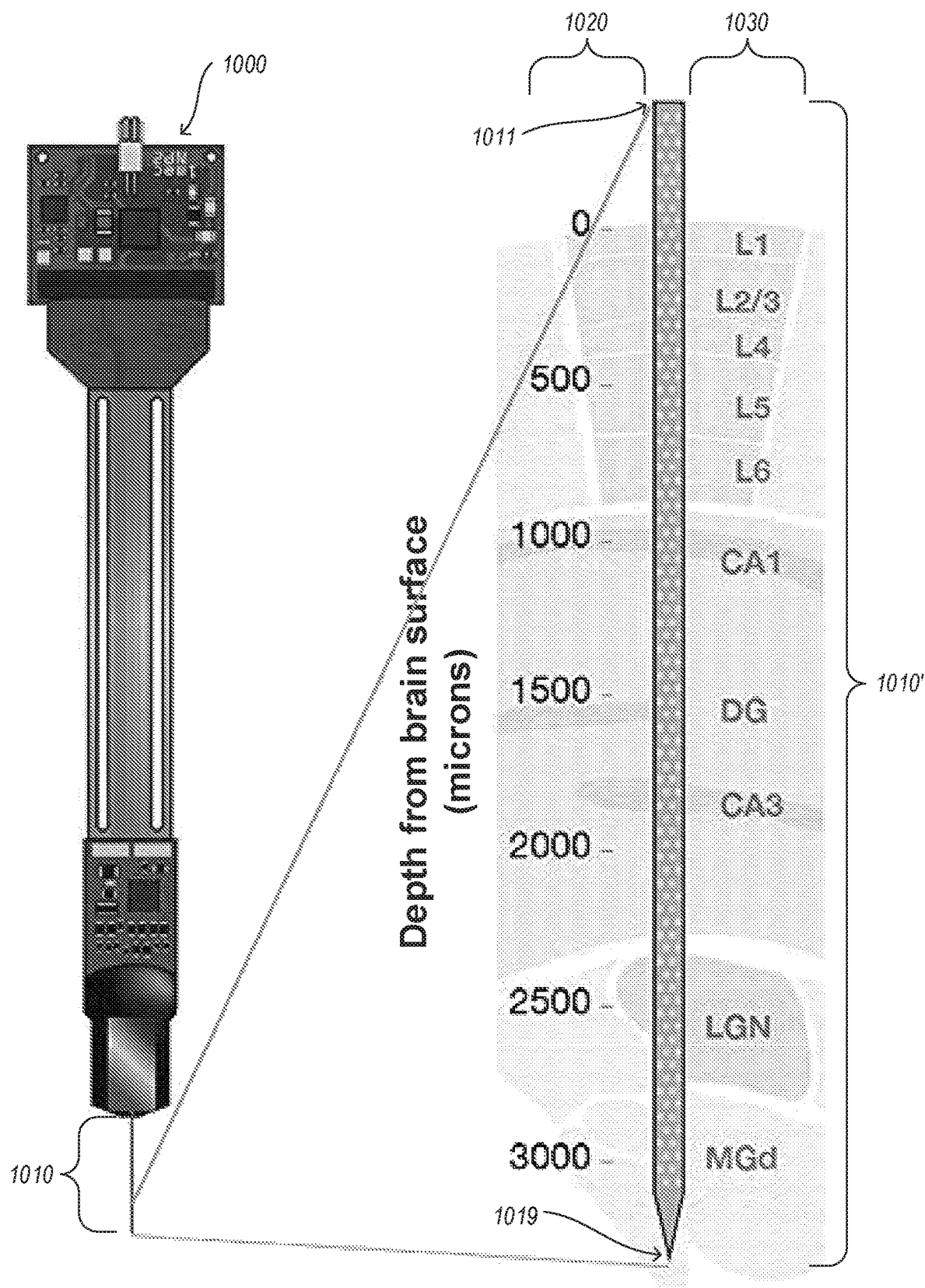
FIG. 10 is a device diagram showing details of a Neuropixels probe next to a schematic of the brain regions it passes through in a typical in vivo electrophysiological recording session.

FIG. 10 is a device diagram showing details of a Neuropixels probe next to a schematic of the brain regions it passes through in a typical in vivo electrophysiological recording session. The probe 1000 includes a shank portion 1010 containing hundreds of recording sites, or "pixels," that is inserted into the brain. Shown at increased magnification as shank portion 1010', 3 mm of shank is typically inserted into the brain. From proximal and 1011 to distal end 1019, the length of the shank contains 383 sensing sites for recording electrical activity from different depths 1020 in brain regions 1030.

The inventors constructed the network for denoising in vivo electrophysiological recordings using the same principles as in FIG. 6. By visually inspecting the neuronal traces recorded at 30 kHz, the inventors found that the background noise was decorrelated for temporal data points separated by more than 2-3 samples. Consequently, the inventors constructed a UNET to predict a central sample within 3 omitted samples from the total activity recorded across all 384 recording sites. Because each individual spike is about 1 ms long and the recording rate is 30 kHz, the inventors set the network to use samples of data prior and subsequent to the 3 omitted samples.

Figure 11:
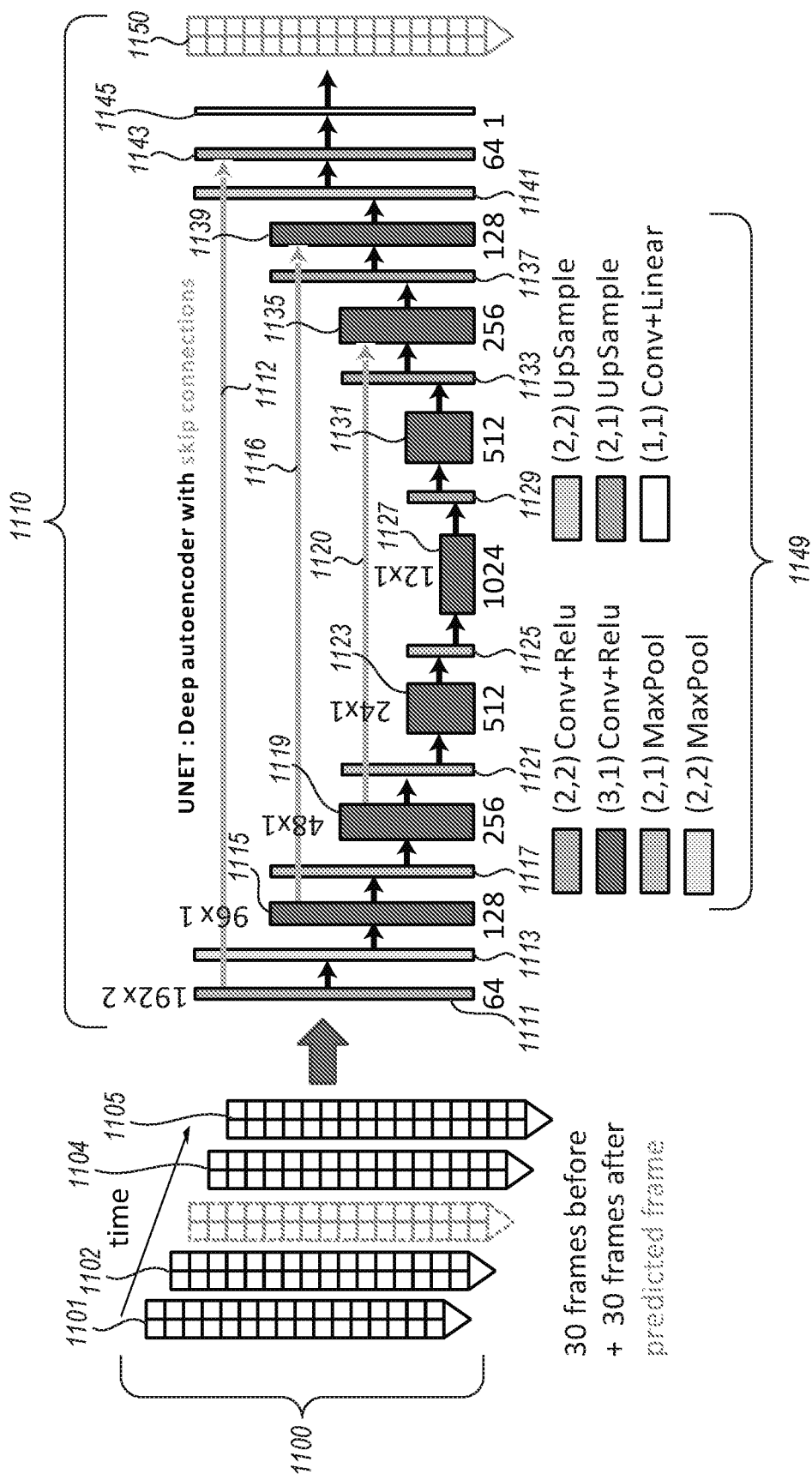
FIG. 11 is a data flow diagram showing the architecture of a sample network used by the facility in some embodiments to denoise in vivo electrophysiological recordings.

FIG. 11 is a data flow diagram showing the architecture of a sample network used by the facility in some embodiments to denoise in vivo electrophysiological recordings. The drawing shows input 1100 to the network 1110 that is made up of a series of 60 samples 1101, 1102, 1104, and 1105 of an in vivo electrophysiological recording. Central sample 1103 is omitted, and is the target 1150 for the network.

A key 1149 shows the type and parameters for each of the layers making up the network, layers 1111, 1113, 1115, 1117, 1119, 1121, 1123, 1125, 1127, 1129, 1131, 1133, 1135, 1137, 1139, 1141, 1143, and 1145. Additionally, the network includes skip connections: skip connection 1112 between layer 1111 and layer 1143; skip connection 1116 between layer 1115 and layer 1139; and skip connection 1120 between layer 1119 and layer 1135.

Figure 12:
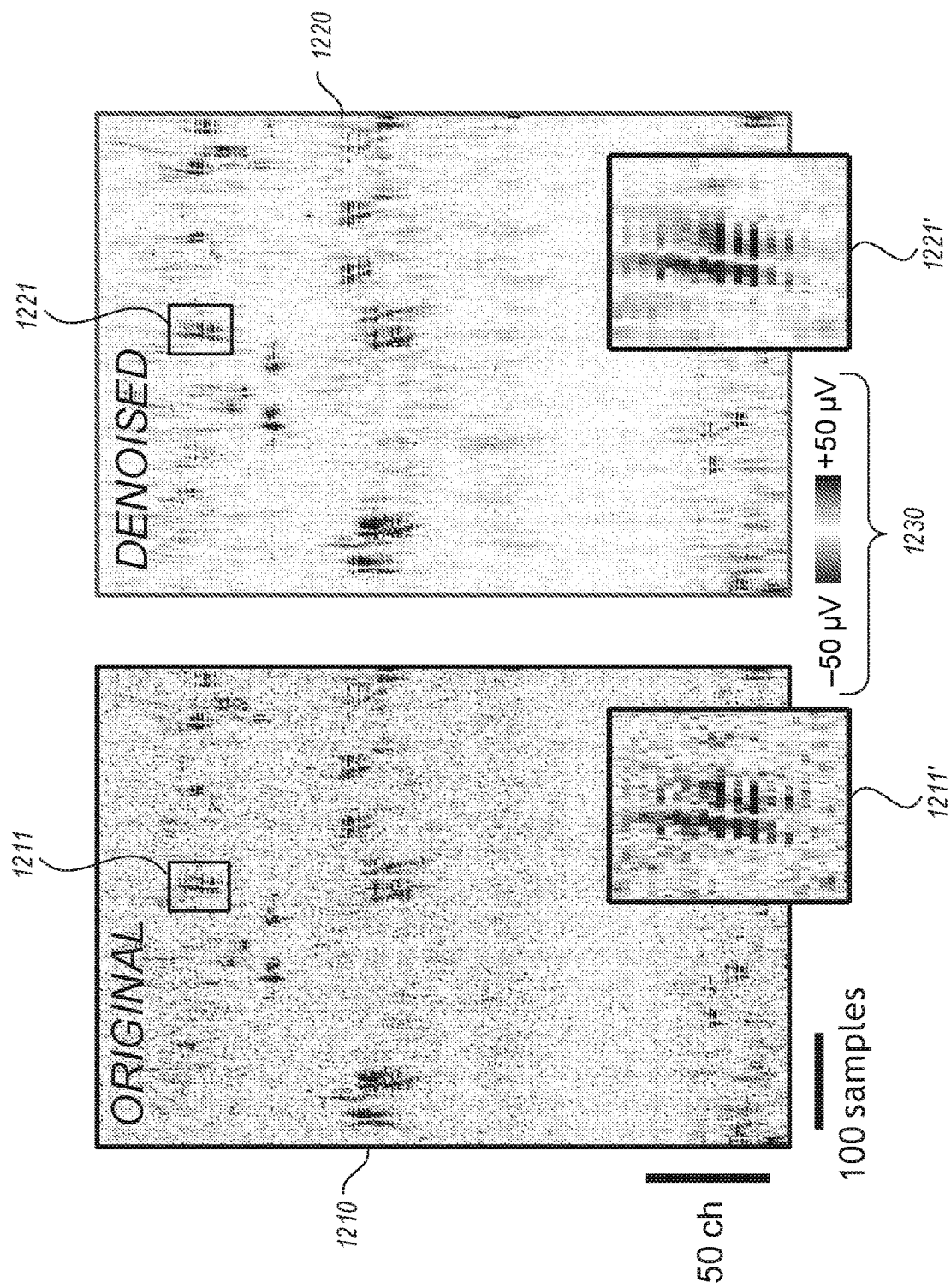
FIG. 12 is an image diagram showing results of an in vivo electrophysiological recording denoising experiment performed by the inventors using the facility.

FIG. 12 is an image diagram showing results of an in vivo electrophysiological recording denoising experiment performed by the inventors using the facility. Image 1210 is a 2D heat map showing channels in the vertical dimension and samples (i.e., time) in the horizontal dimension for the original in vivo electrophysiological recording. The heat map is interpretable using key 1230. Red-to-gray transition zones represent action potential waveforms, the cellular signal that these recordings must detect in order to be effective. Subregion 1211 of the original sample 1210 shows a single action potential, shown at a higher level of magnification as image 1211'. Image 1220 shows a denoised version of the original recording 1210 produced by the facility using the interpolation model. Subregion 1221 of the denoised version of the recording is similarly shown at greater magnification as image 1221'. Both by comparing image 1210 to image 1220 and comparing image 1211' to image 1221', a viewer can appreciate that the denoised version of the recording contains less noise, while still preserving the shape and amplitude of action potential waveforms.

Figure 13:
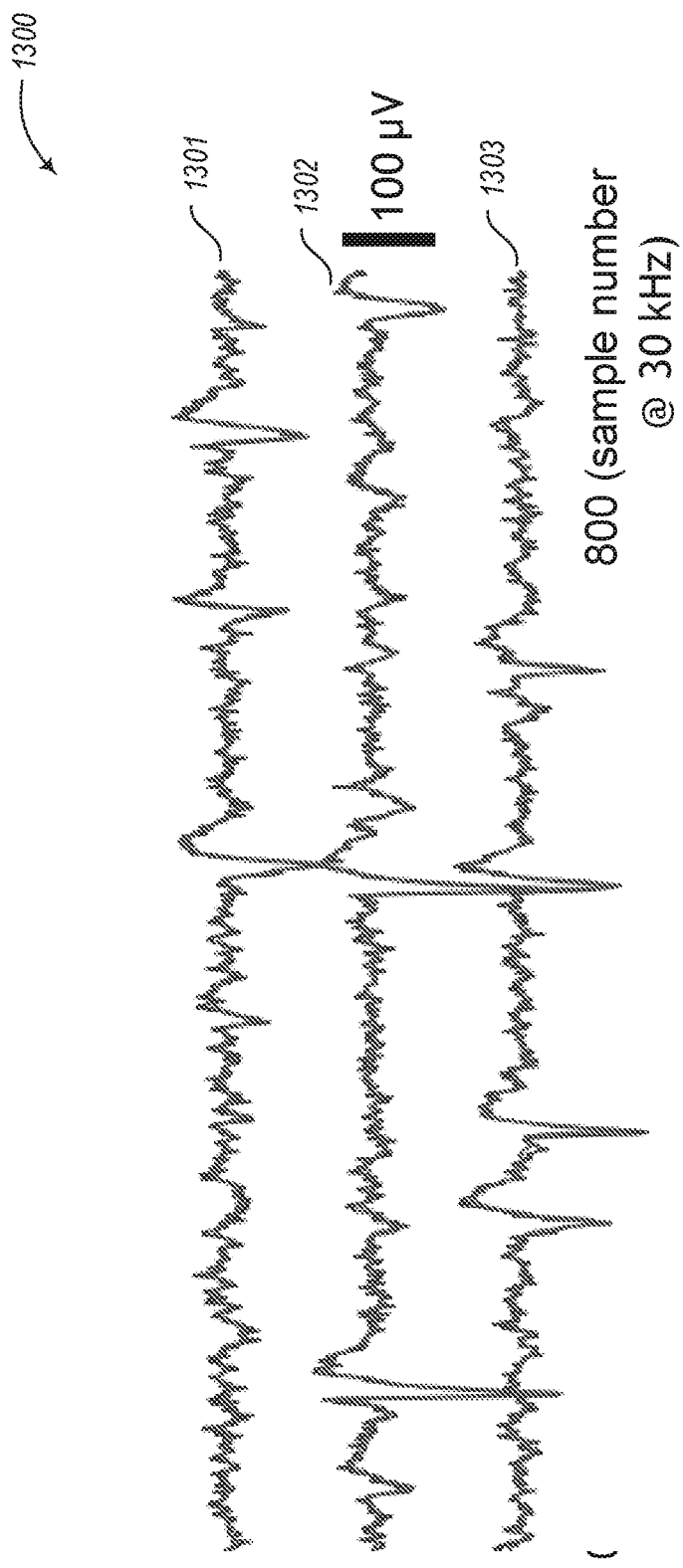
FIG. 13 is a graph diagram showing denoising results produced over time by the facility in the in vivo electrophysiological recording denoising experiment.

FIG. 13 is a graph diagram showing denoising results produced over time by the facility in the in vivo electrophysiological recording denoising experiment. In particular, the graph 1300 contains three example single-channel action potential waveforms for particular sites. In the case of each trace, the smoother red denoised curve is superimposed over the less smooth black original curve.

Figure 14:
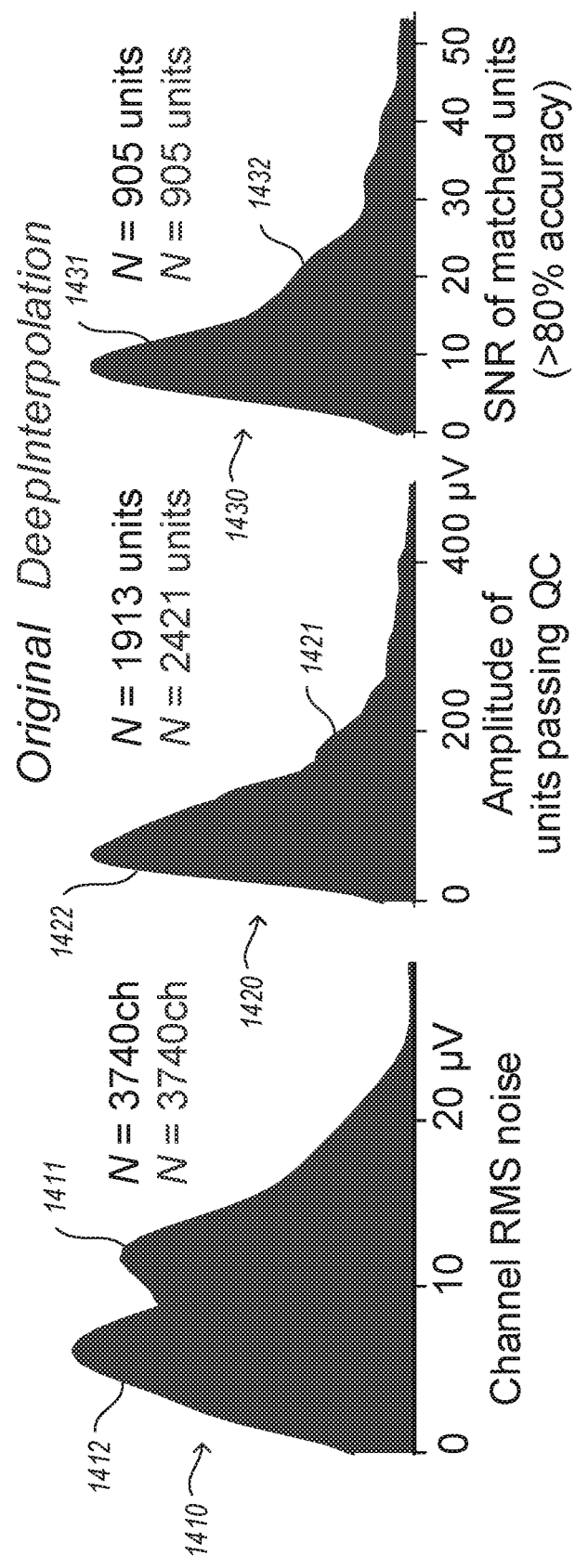
FIG. 14 is a graph diagram showing total noise reduction by the facility in the in vivo electrophysiological recording experiment, and the impact of denoising on recorded "units," which include spikes from one or more nearby neurons.

FIG. 14 is a graph diagram showing total noise reduction by the facility in the in vivo electrophysiological recording experiment, and the impact of denoising on recorded "units," which include spikes from one or more nearby neurons. Among the three shown histograms, histogram 1410 shows root-mean-squared noise for all channels from 10 experiments, both for the original recording 1411 shown in black and the denoised recording 1412 shown in red. Histogram 1420 shows waveform amplitudes for detected units from 10 experiments, both for the original recording 1421 shown in black and the denoised recording 1422 shown in red. Histogram 1430 shows waveform signal-to-noise ratios for all units that were matched before and after denoising, both for the original recording 1431 shown in black and the denoised recording 1432 shown in red. Comparing the number of units detected for an individual shank before and after denoising shows 25.5±14.5% more high-quality neuronal units detected per probe after denoising. Close inspection of the data reveals that this detection improvement was largely due to the detection of smaller action potentials that were previously hidden within the noise.

Denoising Functional Magnetic Resonance Imaging (fMRI)

Having shown the impact of DeepInterpolation on imaging and electrophysiological data, the inventors sought to evaluate how DeepInterpolation could help the analysis of volumetric datasets like fMRI. fMRI is very noisy as the blood-oxygen-level dependent (BOLD) response is typically just a couple percent change of the total signal amplitude. Thermal noise is present in the electrical circuit used for receiving the MR signal. There are also instrumental drifts, artifactual signals due to hardware instabilities as well as physiological sources of noise like motion artifacts and heartbeats. Uncorrelated thermal noise can be as large or even larger than spontaneous activity depending on whether the voxel is in the white of gray matter. As a result, a typical fMRI processing pipeline involves averaging nearby pixels and successive trials to increase the SNR. The inventors reasoned that DeepInterpolation could replace smoothing kernels with more optimal local interpolation functions and increase SNR at the voxel level in fMRI without sacrificing spatial or temporal resolution.

Because the sampling rate of a full brain fMRI volume is typically between 0.3 and 0.5 Hz, a single recording session could only provide several hundred full brain volumes. In contrast, a single 10 min recording session with 3×3×3 mm voxels across the whole brain can provide as many as 9 millions voxels. To augment the available training datasets, rather than learning a full brain interpolation model, the inventors sought to train a more local interpolation function.

To reconstruct the value of a brain sub-volume, the facility feeds a neural network with a consecutive temporal series of 7×7×7 voxels, omitting one instance of the entire target volume from the input. As with two photon imaging, the facility uses an encoder-decoder architecture having skip connections. To allow the interpolation network to be robust to edge conditions, input volumes on the edge of the volume were fed with zeros for missing values. For inference, the facility can involve the denoising network through all voxels of the volume, across both space and time, using only the center pixel of the output reconstructed volume to avoid any potential volume boundaries artifacts.

Figure 15:
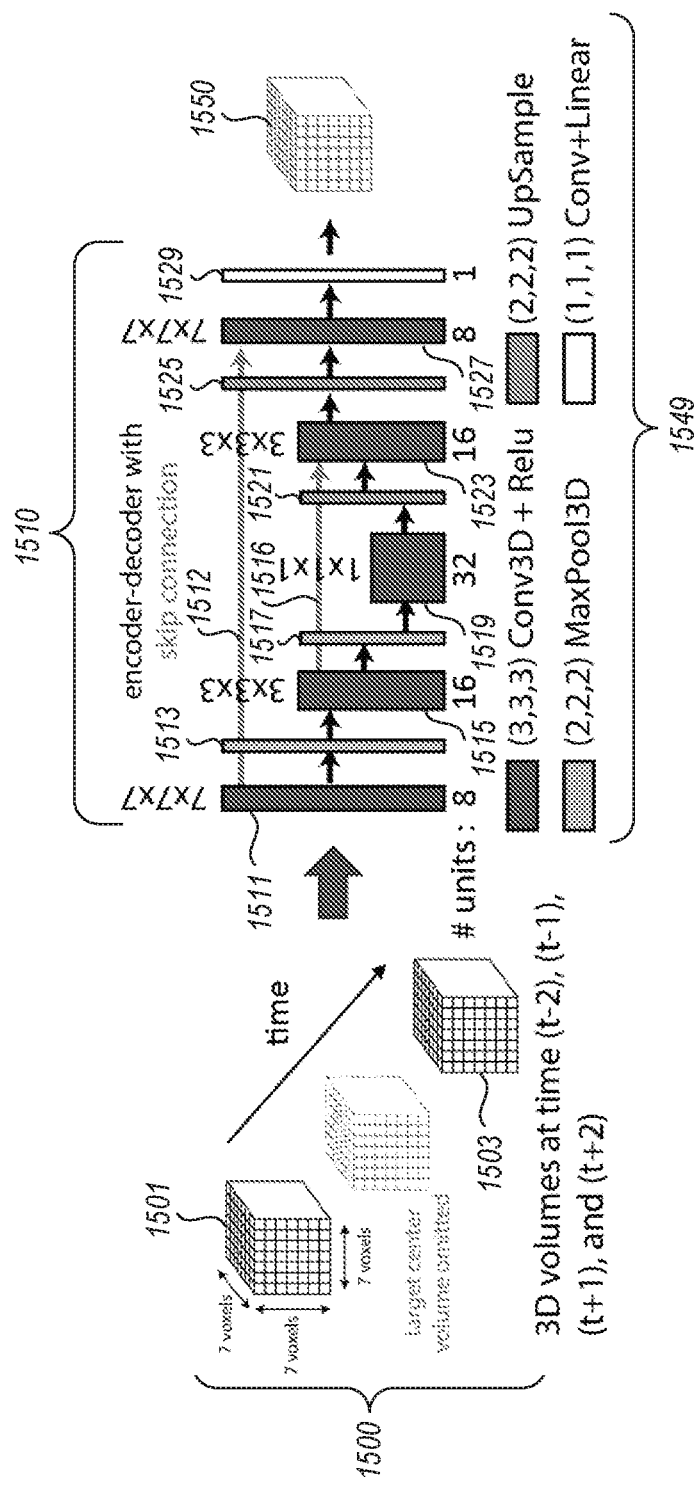
FIG. 15 is a data flow diagram showing the architecture of a sample network used by the facility in some embodiments to denoise a three-dimensional fMRI video.

FIG. 15 is a data flow diagram showing the architecture of a sample network used by the facility in some embodiments to denoise a three-dimensional fMRI video. The facility decomposes the volume depicted in the three-dimensional video into cubes of 7×7×7 voxels. For each cube, the facility advances a frame window through the time dimension of the video, capturing the contents of the cube for two times before the central time and two times after the central time The drawing shows input 1500 to the network 1510 that is made up of these 7×7×7 voxel cubes, omitting the cube 1502 for the central time.

A key 1549 shows the type and parameters for each of the layers making up the network, layers 1511, 1513, 1515, 1517, 1519, 1521, 1523, 1525, 1527, and 1529. Additionally, the network includes skip connections: skip connection 1512 from layer 1511 two layer 1527; and skip connection 1516 from layer 1515 to layer 1523.

To illustrate the denoising performance of DeepInterpolation with fMRI datasets, the inventors utilized open fMRI datasets available on openeuro.org, avoiding using any pre-processed data as they often had an averaging kernel applied. The inventors found that such kernels would damage the independence of voxel noise, a key property needed to avoid overfitting by the DeepInterpolation algorithm. Denoising raw fMRI data also allowed the inventors to maintain the full spatial resolution of the original brain scan.

Figure 16:
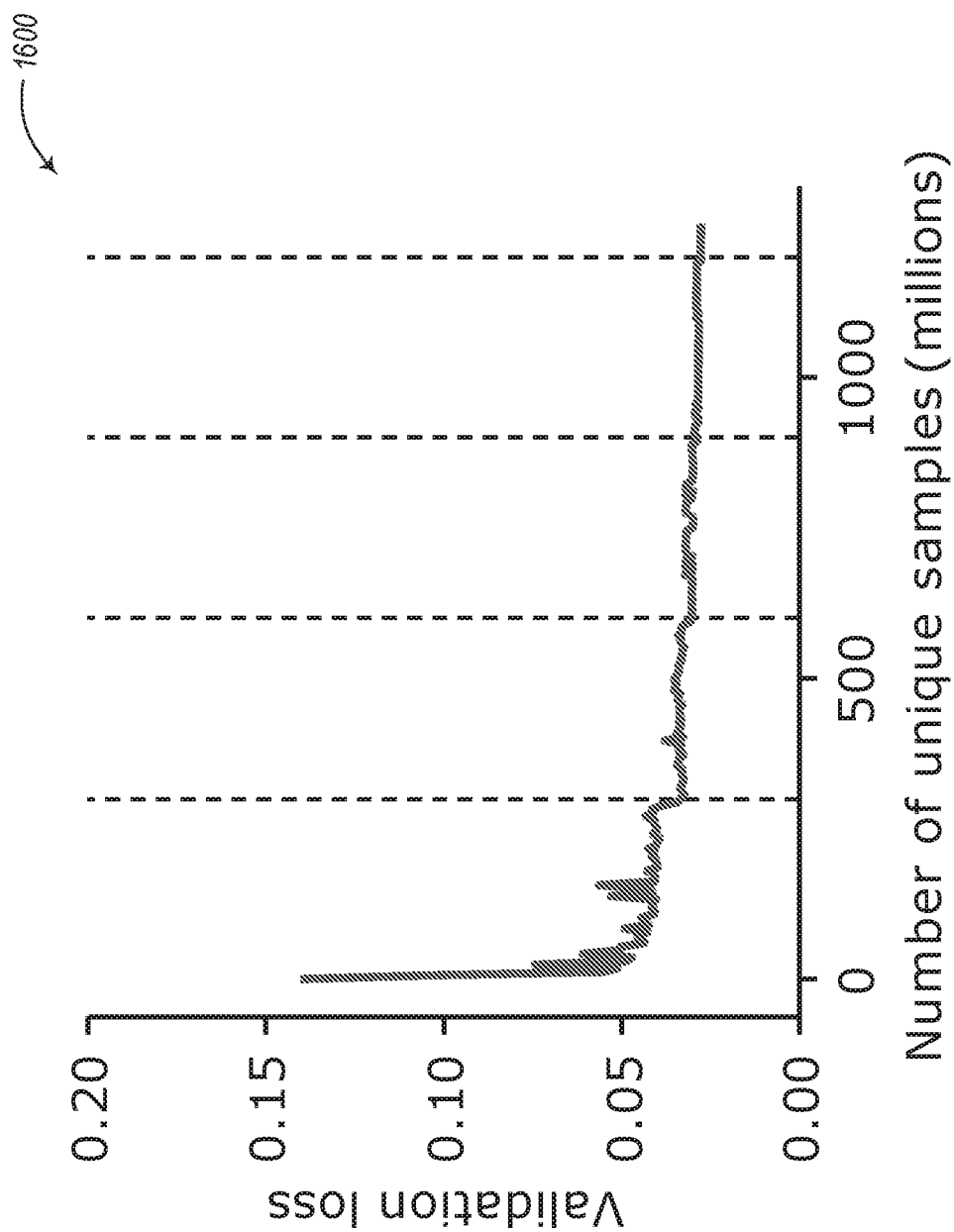
FIG. 16 is a graph diagram showing the change in validation loss as the training of the fMRI denoising network proceeded.

The inventors trained a single denoising network using 140 fMRI datasets acquired across 5 subjects. FIG. 16 is a graph diagram showing the change in validation loss as the training of the fMRI denoising network proceeded. In particular, the graph 1600 shows that the validation loss converged after 1.2 billion samples. Each training sample was presented only once to avoid any chance of overfitting. Vertical lines show when the global learning rate of the RMSProp optimization algorithm is decreased by a factor of 2 to facilitate training.

Figure 17:
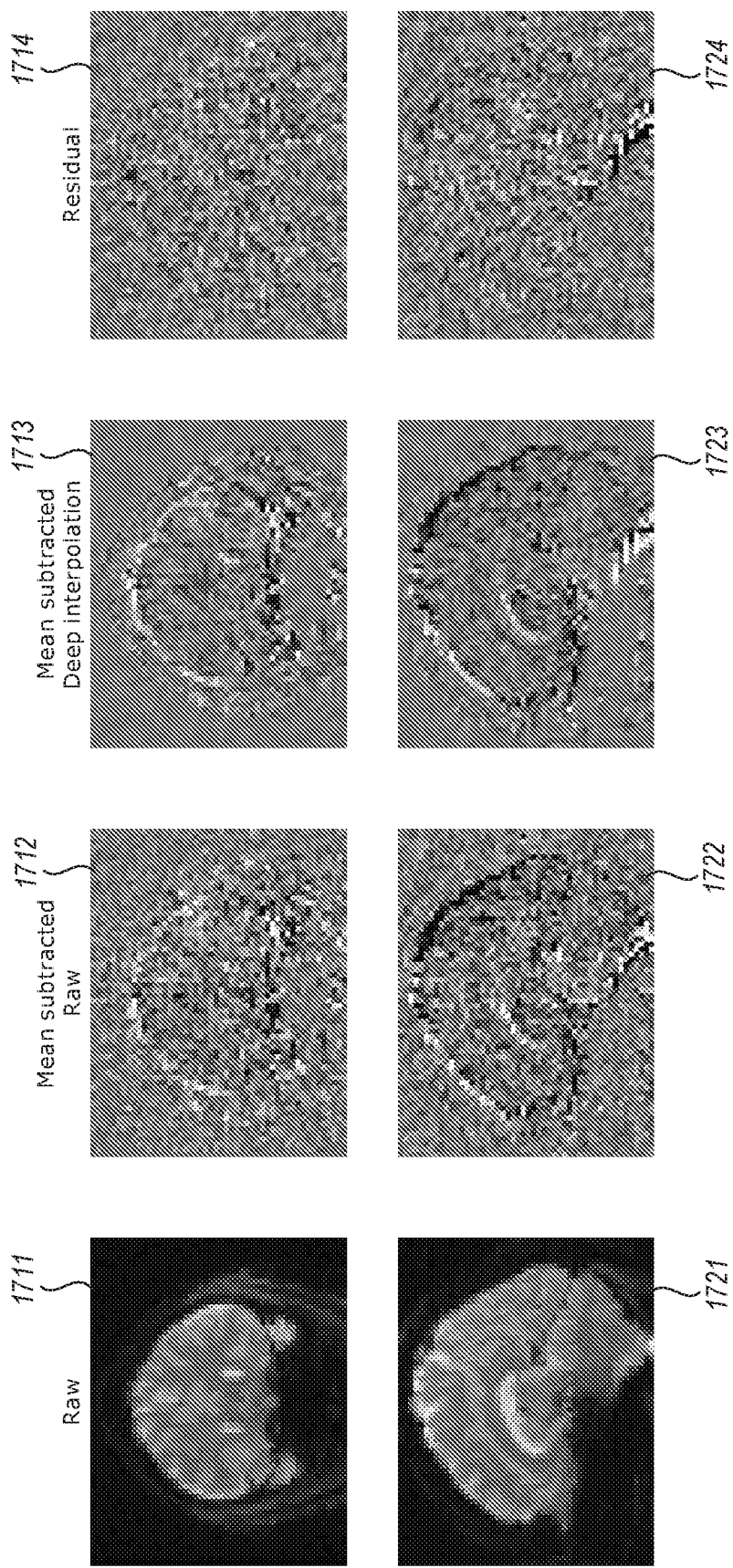
FIG. 17 is an image diagram showing results of an fMRI denoising experiment performed by the inventors using the facility.

After training, the inventors applied the network to held-out test data, showing excellent denoising performance. FIG. 17 is an image diagram showing results of an fMRI denoising experiment performed by the inventors using the facility. In particular, the included images depict the reconstruction of a single fMRI volume. Images 1711-1714 show a coronal section of a human brain, while images 1721-1724 show a sagittal section. Images 1711 and 1721 show the original images for these brain sites. In images 1712 and 1722, the temporal mean of the 3D scan is removed to better illustrate the presence of thermal noise in the raw data. Images 1713 and 1723 show the results of denoising the original images 1711 and 1721. Images 1714 and 1724 show the residual of the denoising. A viewer can appreciate that the residuals capture independent noise without any signal structure. Occasional large blood vessels are visible in the residual, such as at the bottom of image 1724. By comparing image 1713 to image 1714 and comparing image 1723 to image 1724, it can be seen that background noise around the head was clearly excluded from the denoised version—it is only present in the residual images 1714 and 1724. Surrounding soft tissues became clearly visible after denoising, and the residual showed very similar noise power for both voxels within and outside of the subject head.

Figure 18:
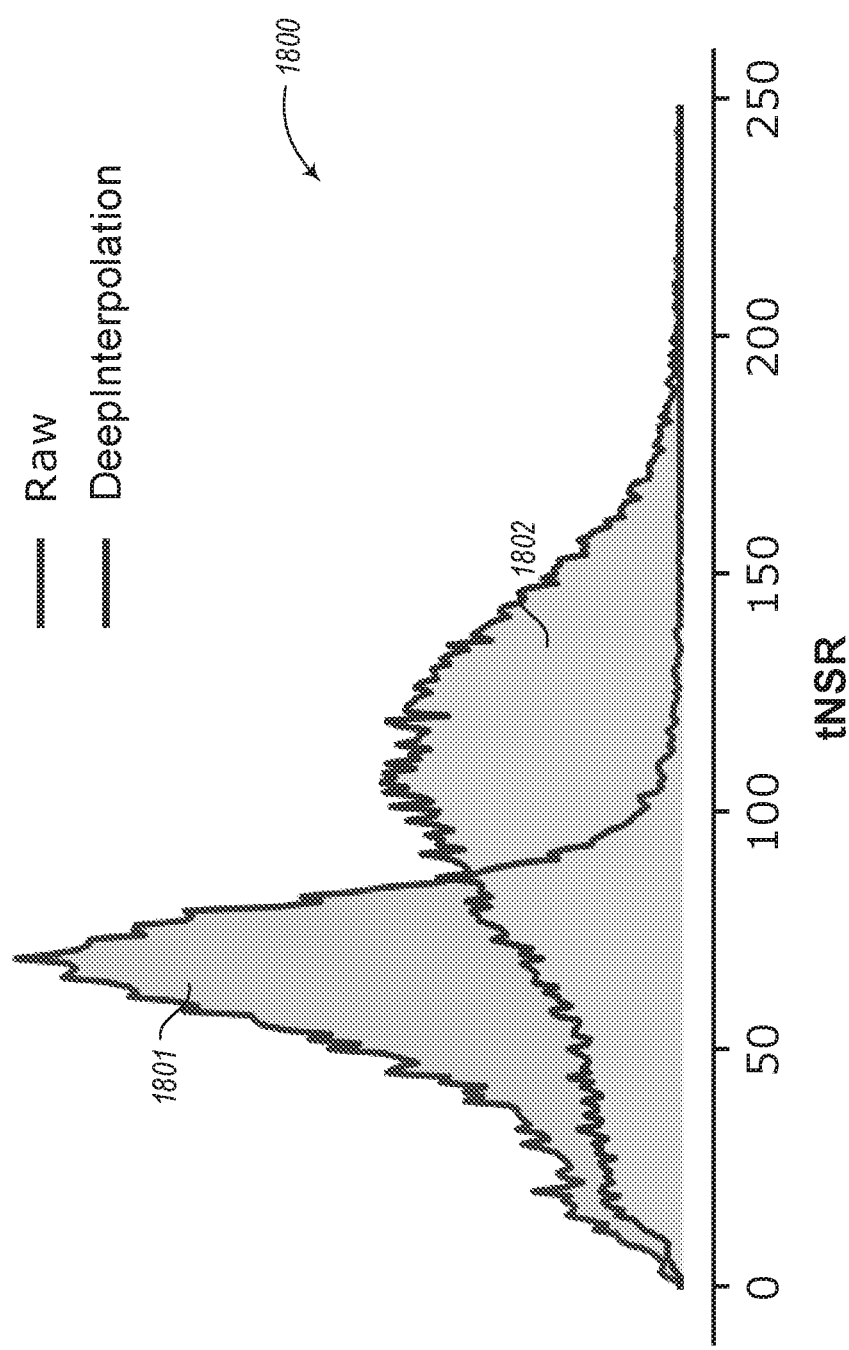
FIG. 18 is a graph diagram showing denoising results produced over time by the facility in the fMRI denoising experiment.

FIG. 18 is a graph diagram showing denoising results produced over time by the facility in the fMRI denoising experiment. In particular, the graph (1800) is a histogram of tSNR (averaged signal divided by standard deviation across times for each voxel) for 10,000 voxels randomly distributed in the brain volume in raw data and after DeepInterpolation. It can be seen that the tSNR increased from 61.6+/−20.6 to 100.40+/−38.7, i.e. by 63%.

Figure 19:
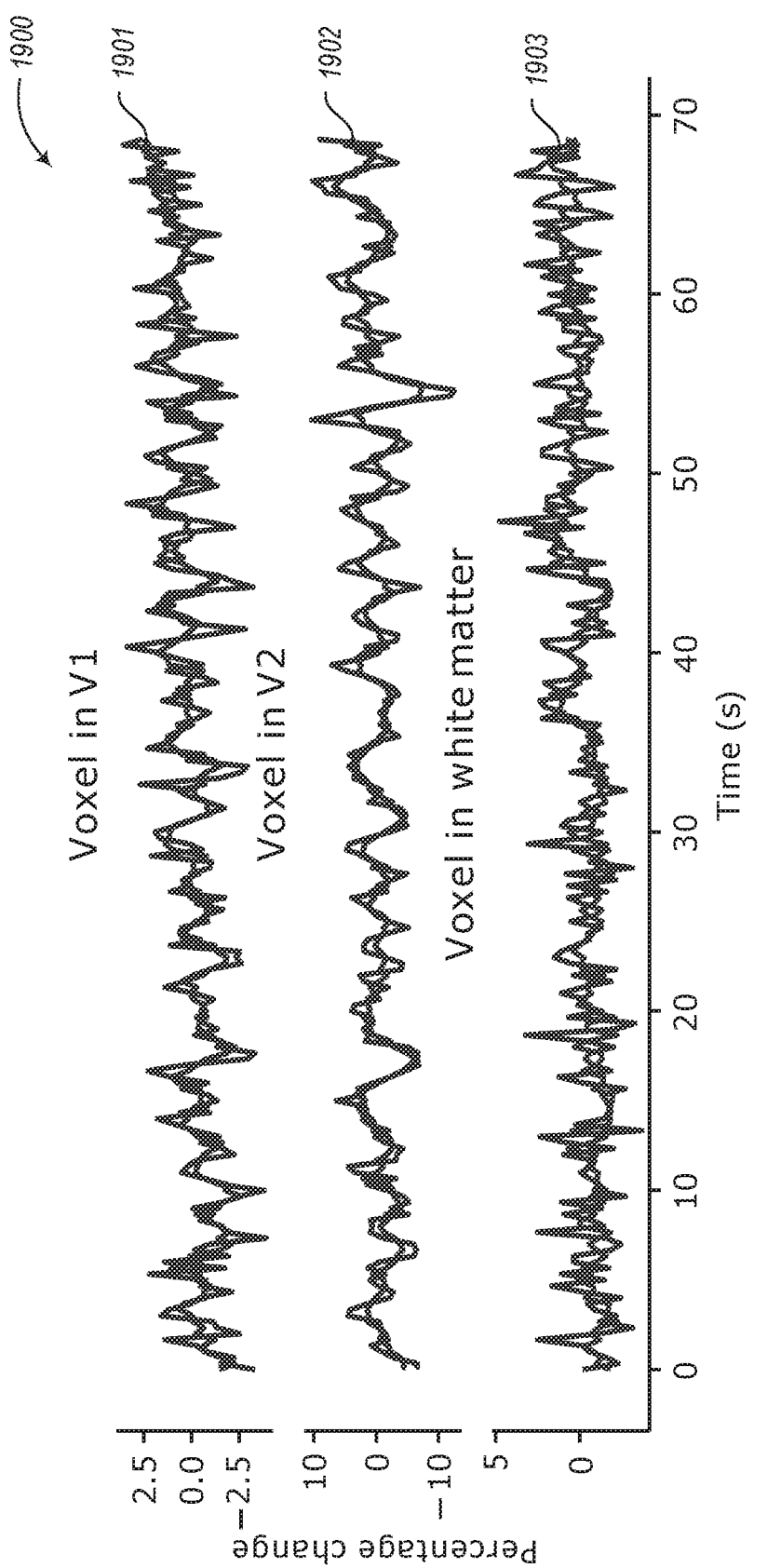
FIG. 19 is an additional graph diagram showing denoising results produced over time by the facility in the fMRI denoising experiment.

FIG. 19 is an additional graph diagram showing denoising results produced over time by the facility in the fMRI denoising experiment. In particular, the graph 1900 shows three temporal traces 1901-1903 from individual voxels. In particular, trace 1901 represents a voxel in V1; trace 1902 represents a voxel in V2; and trace 1903 represents a voxel in white matter. In the case of each trace, the smoother red denoised curve is superimposed over the less smooth black original curve.

Data Sampling and Interpolation Strategies

The samples for calcium imaging were collected at 30 Hz and the samples for electrophysiology were collected at 30 kHz. Sampling rates along all relevant axes of data collection (e.g., space, time) should be high enough such that discrete events in the signal of interest are present across three or more samples, since three is the minimum number of samples over which an interpolation function can be learned, i.e., learning to predict the center sample from the adjacent samples. For a causal, non-interpolative version of the algorithm, the minimum number of samples on which a signal event would appear would be two. However, these are theoretical absolute minimums which depend on completely independent noise. When noise exhibits some autocorrelation, the inventors leave a gap equal to the autocorrelation length between the input samples and the predicted sample to prevent the model from fitting the noise. The presence of this gap necessitates that discrete events must be sampled densely enough that their signal spans the gap. The absolute minimum of samples a discrete event should span would thus be 2*(noise autocorrelation length)+2 for the interpolative version and (noise autocorrelation length)+1 for the causal version.

Training Strategy

When data is abundant, the inventors have found that it is possible to train a single DeepInterpolation model on data from many different recordings, provided they are similar (e.g., all recording of neural calcium fluorescent at the same sampling rate), and have the model generalize and denoise unseen data.

The inventors have also found that a single recording session can be denoised by training a model on just that data and using it to predict and denoise that data. The choice between these two methods will often come down to resource allocation. When data is extremely abundant (e.g., thousands of recordings) it can be prohibitively computationally costly to train a separate model for each dataset and can be a better use of resources to train a more general model on randomly selected subsets across all the recordings.

The inventors regard this denoising approach applicable to all data from any one specific instrument, from any one instrument type (i.e., many copies of the same instrument), applicable to all data from one subject or from one brain area.

GENERAL APPLICABILITY

While the inventors show here a limited number of examples, this methodology is very broadly applicable and could benefit all scientific fields and domains of engineering. Indeed, independent noise will be present in any recordings that sample signals over regular intervals of space and/or time, including but not limited to: audio recordings, pressure sensors, atmospheric data, satellite imaging, stellar, galactic or extra-galactic imaging, RF measurements, and electron microscopy. All techniques using cameras affected by read noise in low light condition will benefit from this approach. The facility can be applied to biomedical research and astronomy, geophysics (earth quake monitoring, nuclear explosion monitoring, oil and gas prospecting), industrial process monitoring, and many other domains. Any recording that attempts to measure weak events hidden under a large amount of independent noise is transformed by the facility: detectors in physics, measurement of temperatures, flow, pressure and other sensors in a physical plant, etc. The ability to learn denoising functions without ground truth also opens the door to fully automated devices that can denoise any signal source provided very minimal settings on the correlation length of the noise to remove.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system for generating a denoised video sequence from a source video sequence, comprising:
   accessing a set of training video sequences;
   among the training video sequences, selecting a plurality of contiguous series of frames;

for each of the plurality of selected contiguous series of frames, defining a training observation in which a central frame in the contiguous series of frames is the dependent variable, and the frames of the contiguous series of frames other than the central frame are independent variables;

training a machine learning model using the defined training observations;

for each of a plurality of subject frames of the source video sequence:
  selecting a first contiguous series of frames of the source video sequence immediately before the subject frame;
  selecting a second contiguous series of frames of the source video sequence immediately after the subject frame; and
  applying the trained machine learning model to the selected first and second contiguous series of frames, to the exclusion of the subject frame, to obtain a denoised version of the subject frame; and
  assembling the obtained denoised subject frame versions into the denoised video sequence.

2. The method of claim 1, further comprising storing the assembled denoised video sequence.

3. The method of claim 1, further comprising causing the assembled denoised video sequence to be displayed.

4. The method of claim 1 wherein the set of training video sequences contains only the source sequence.

5. The method of claim 1 wherein the set of training video sequences is a plurality of video sequences that includes the source sequence.

6. The method of claim 1 wherein the set of training video sequences is a plurality of video sequences that excludes the source sequence.

7. A computing system for generating a denoised video sequence from a source video sequence, the computing system being configured to:
  access a set of training video sequences;
  among the training video sequences, select a plurality of contiguous series of frames;
  for each of the plurality of selected contiguous series of frames, define a training observation in which a central frame in the contiguous series of frames is the dependent variable, and the frames of the contiguous series of frames other than the central frame are independent variables;
  train a machine learning model using the defined training observations;
  for each of a plurality of subject frames of the source video sequence:
    select a first contiguous series of frames of the source video sequence immediately before the subject frame;
    select a second contiguous series of frames of the source video sequence immediately after the subject frame; and
    apply the trained machine learning model to the selected first and second contiguous series of frames, to the exclusion of the subject frame, to obtain a denoised version of the subject frame; and
  assemble the obtained denoised subject frame versions into the denoised video sequence.

8. The computing system of claim 7, wherein the computing system is further configured to store the assembled denoised video sequence.

9. The computing system of claim 7, wherein the computing system is further configured to cause the assembled denoised video sequence to be displayed.

10. The computing system of claim 7, wherein the set of training video sequences contains only the source sequence.

11. The computing system of claim 7, wherein the set of training video sequences is a plurality of video sequences that includes the source sequence.

12. The computing system of claim 7, wherein set of training video sequences is a plurality of video sequences that excludes the source sequence.

13. One or more instances of computer-readable media, the one or more instances of computer-readable media not constituting a transitory propagating data signal and collectively having contents configured to cause a computing system for generating a denoised video sequence from a source video sequence to perform a method, the method comprising:
  accessing a set of training video sequences;
  among the training video sequences, selecting a plurality of contiguous series of frames;
  for each of the plurality of selected contiguous series of frames, defining a training observation in which a central frame in the contiguous series of frames is the dependent variable, and the frames of the contiguous series of frames other than the central frame are independent variables;
  training a machine learning model using the defined training observations;
  for each of a plurality of subject frames of the source video sequence:
    selecting a first contiguous series of frames of the source video sequence immediately before the subject frame;
    selecting a second contiguous series of frames of the source video sequence immediately after the subject frame; and
    applying the trained machine learning model to the selected first and second contiguous series of frames, to the exclusion of the subject frame, to obtain a denoised version of the subject frame; and
  assembling the obtained denoised subject frame versions into the denoised video sequence.

14. The one or more instances of computer-readable media of claim 13, wherein the method further comprises storing the assembled denoised video sequence.

15. The one or more instances of computer-readable media of claim 13, wherein the method further comprises causing the assembled denoised video sequence to be displayed.

16. The one or more instances of computer-readable media of claim 13, wherein the set of training video sequences contains only the source sequence.

17. The one or more instances of computer-readable media of claim 13, wherein the set of training video sequences is a plurality of video sequences that includes the source sequence.

18. The one or more instances of computer-readable media of claim 13, wherein the set of training video sequences is a plurality of video sequences that excludes the source sequence.

* * * * *